(12) United States Patent
Schuttenberg (10) Patent No.: US 9,164,900 B1
(45) Date of Patent: Oct. 20, 2015

(54) METHODS AND SYSTEMS FOR EXPANDING PRELOAD CAPABILITIES OF A MEMORY TO ENCOMPASS A REGISTER FILE

(71) Applicant: Marvell International Ltd., Hamilton (BM)

(72) Inventor: Kim Schuttenberg, Gilbert, AZ (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 301 days.

(21) Appl. No.: 13/893,871

(22) Filed: May 14, 2013

Related U.S. Application Data (60) Provisional application No. 61/650,941, filed on May 23, 2012, provisional application No. 61/754,325, filed on Jan. 18, 2013.

(51) Int. Cl.
*G06F 12/00* (2006.01)
*G06F 13/00* (2006.01)
*G06F 12/02* (2006.01)
*G06F 12/08* (2006.01)

(52) U.S. Cl.
CPC ........ *G06F 12/0292* (2013.01); *G06F 12/0862* (2013.01)

(58) Field of Classification Search
None
See application file for complete search history.

(56) References Cited

U.S. PATENT DOCUMENTS

| | | | |
|---|---|---|---|
| 5,774,358 A | 6/1998 | Shrote | |
| 5,996,068 A * | 11/1999 | Dwyer et al. | 712/228 |
| 6,163,839 A * | 12/2000 | Janik et al. | 712/219 |
| 6,430,680 B1 | 8/2002 | Burky et al. | |
| 6,976,147 B1 | 12/2005 | Isaac et al. | |
| 7,496,735 B2 | 2/2009 | Yourst et al. | |
| 7,774,578 B2 | 8/2010 | Keltcher | |
| 2003/0163671 A1 * | 8/2003 | Gschwind et al. | 712/214 |
| 2004/0024993 A1 * | 2/2004 | Parthasarathy | 712/218 |
| 2004/0133747 A1 | 7/2004 | Coldewey | |
| 2005/0125632 A1 | 6/2005 | Alsup et al. | |
| 2006/0179239 A1 | 8/2006 | Fluhr et al. | |
| 2007/0118724 A1 * | 5/2007 | Patel | 712/202 |
| 2008/0288751 A1 | 11/2008 | Kocev | |
| 2010/0293339 A1 | 11/2010 | Arimilli et al. | |
| 2011/0173397 A1 | 7/2011 | Boyle et al. | |
| 2012/0166733 A1 | 6/2012 | Cherukuri et al. | |

OTHER PUBLICATIONS

Office Action issued Mar. 25, 2015 in related/corresponding U.S. Appl. No. 14/011,152, filed Aug. 27, 2013.

(Continued)

*Primary Examiner* — Sean D Rossiter (57) ABSTRACT

A method for expanding preload capabilities of a memory to encompass a register file is provided. The method comprises predicting an address of a memory location containing data to be accessed by a first memory operation instruction that has not yet executed, prior to the first memory operation instruction executing moving the data in the memory location to an unassigned register file entry, and causing a renaming register to assign the register file entry to an architectural register. Responsive to the renaming register assigning the register file entry to the architectural register, the method further comprises permitting a second instruction to execute using the data moved to the register file, wherein the second instruction is dependent on the first memory operation instruction.

18 Claims, 11 Drawing Sheets

(56) References Cited

OTHER PUBLICATIONS

Steven P. Vanderwiel and David J. Lilja 2000. Data prefetch mechanisms. ACM Comput. Surv. 32, 2 (Jun. 2000), 174-199. DOI=10.1145/358923.358939 <http://doi.acm.org/10.1145/358923.358939>.

Office Action issued Jan. 29, 2015 in related/corresponding U.S. Appl. No. 13/847,156, filed Mar. 19, 2015.

* cited by examiner

```
string_legalize_loop:
        LDR r0,[r4] ,#4
        MOV r1,r0
        CMP r0,#'\'
        MOVEQ r1,#'-'
        CMP r0,#'('
        MOVEQ r1,#'{'
        CMP r0,#')'
        MOVEQ r1,#'}'
        CMP r0,#':'
        MOVEQ r1,#'='
        STR R1,[r5], #4
        CMP r0,#0 ;;end of string
        BNE string_legalize_loop
```

Iterates through a 'C' string removing 'illegal' characters.

FIG. 10

```
Example Execution with L1 Latency=3
Cycle            1     2     3     4      5      6      7      8      9
Iteration0      LDR                      MOV   MOVEQ MOVEQ MOVEQ MOVEQ STR
                                         CMP   CMP   CMP   CMP   CMP   BNE
``` cycles per iteration: 9
instructions per iteration:13
IPC/iteration in flight:1.444
Instruction window needed to reach 4 IPC:36 (perfect ooo superscalar machine).
ALU Execution Units need to reach IPC 4: 5

FIG. 11A

```
Example execution with PRF preloading turns L1 hit into a zero cycle move.
Cycle            1     2     3     4      5      6
Iteration0      LDR
                ZCM
                MOV   MOVEQ MOVEQ MOVEQ MOVEQ STR
                CMP   CMP   CMP   CMP   CMP   BNE
``` cycles per iteration: 6
instructions per iteration:13
IPC/iteration in flight:2.167
Instruction window needed to reach 4 IPC:18 (perfect ooo superscalar machine).
ALU Execution Units need to reach IPC 4: 3.5

FIG. 11B

METHODS AND SYSTEMS FOR EXPANDING PRELOAD CAPABILITIES OF A MEMORY TO ENCOMPASS A REGISTER FILE

CROSS-REFERENCE TO RELATED APPLICATIONS

The present application claims priority from U.S. Provisional Application No. 61/754,325, filed on Jan. 18, 2013, entitled "Expanding Memory Preload Capabilities to Encompass a Register File" and U.S. Provisional Application No. 61/650,941, filed on May 23, 2012, entitled "Expanding Memory Preload Capabilities to Encompass a Register File," which are incorporated herein by reference.

TECHNICAL FIELD

The technology described herein relates generally to microprocessor logic design.

BACKGROUND

One metric for describing microprocessor performance is the load-use cost, which refers to the number of cycles that must pass between an operation that loads information from a memory location and an instruction that uses the information from that memory location. The load-use cost takes into account the time associated with removing information from memory, formatting the information, and storing the information in the register file of the processor for use by other instructions. Various schemes exist for lowering load use, such as caching schemes, which store a subset of the data in smaller, faster memory closer to the processor.

Register-renaming is used in some microprocessor designs. With register renaming, an architecturally specified register comprises a pointer that points to a much larger array of registers. This allows for speculative execution of instructions without excessive amounts of data movement.

SUMMARY

In accordance with the teachings provided herein, systems and methods are provided for expanding the preload capabilities of a memory to encompass a register file. According to some examples, this may reduce the load-use cost. In one example, the method comprises predicting an address of a memory location containing data to be accessed by a first memory operation instruction that has not yet executed, prior to the first memory operation instruction executing moving the data in the memory location to an unassigned register file entry, and causing a renaming register to assign the register file entry to an architectural register. Responsive to the renaming register assigning the register file entry to the architectural register, the method further comprises permitting a second instruction to execute using the data moved to the register file, wherein the second instruction is dependent on the first memory operation instruction.

These aspects and other embodiments may include one or more of the following features. Moving the data may comprise causing the data to be stored in cache memory and moving the data from the cache memory to the register file entry. The method may further comprise storing details of the first memory operation instruction and the register file entry in a table. The unassigned register file entry may be an entry in a physical register file. Moving the data in the memory location to an unassigned register file entry prior to the first memory operation instruction executing may comprise moving the data in the memory location to an unassigned register file entry prior to the first memory operation instruction being decoded. The method may further comprise, subsequent to the first memory operation instruction being decoded, associating the assignment of the register file entry to the first memory operation instruction. The second instruction that is dependent on the first memory operating instruction may execute prior to the first memory operating instruction executing. The method may further comprise associating the assignment of the register file entry to the first memory operating instruction. Moving the data in the memory location to an unassigned register file entry may comprise generating and triggering execution of a third memory operation instruction before the first memory operation instruction executes, wherein execution of the third memory operation instruction causes the data to be stored in cache memory. Moving the data in the memory location to an unassigned register file entry may also comprise moving data in cache memory that was fetched but not used by an executed memory operation instruction to the unassigned register file entry. The method may further comprise determining that the first memory operation instruction has not been decoded and returning the register file entry to a free state. The method may further comprise determining whether the correct data was moved to the register file entry for the first memory operation instruction. Determining whether the correct data was moved to the register file entry for the first memory operation instruction may comprise checking for possible events that could cause the wrong data to be moved to the register file entry for the first memory operation instruction. Determining whether the correct data was moved to the register file entry for the first memory operation instruction may also comprise executing a fourth memory operation instruction that retrieves data and comparing the data retrieved by the fourth memory operation instruction to the data moved for the first memory operation instruction. The method may further comprise determining that incorrect data was moved to the register file entry for the first memory operation instruction, discarding a program instruction that is dependent on the first memory operating instruction to fetch the data, and re-executing the discarded program instruction using the correct data.

In accordance with another example, a computer system comprising a register file, a renaming register, and a preload engine is provided. The register file has a plurality of entries. The renaming register is for associating an entry in the register file with an architectural register. The preload engine is configured to predict an address of a memory location containing data to be accessed by a first memory operation instruction that has not yet executed, prior to the predicted memory operation instruction executing move the data in the memory location to an unassigned register file entry in the register file, and cause the renaming register to assign the register file entry to the architectural register. Responsive to the renaming register assigning the register file entry to the architectural register the preload engine is further configured to permit a second instruction to execute using the data moved to the register file, wherein the second instruction is dependent on the first memory operating instruction.

These aspects and other embodiments may include one or more of the following features. The register file may be a physical register file. The preload engine may be further configured to subsequent to the first memory operation instruction being decoded, associate the assignment of the register file entry to the first memory operation instruction. The preload engine may be further configured to determine that incorrect data was moved to the register file entry for the first memory operation instruction, discard a program instruction that is dependent on the first memory operating instruction to fetch the data, and re-execute the discarded program instruction using the correct data.

DETAILED DESCRIPTION

Figure 1:
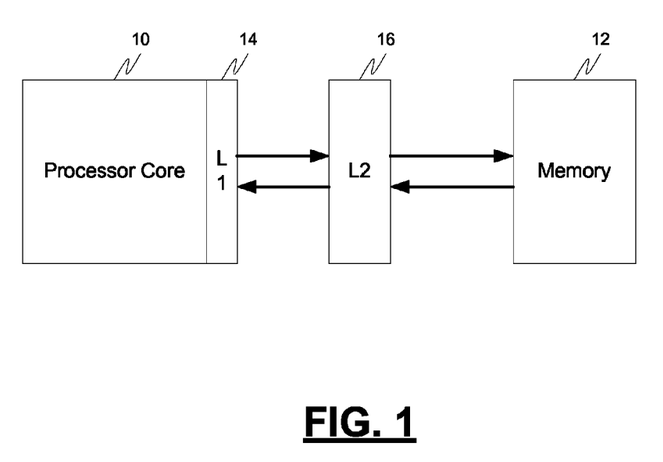
FIG. 1 is a block diagram depicting an example computing system.

FIG. 1 is a block diagram of an example computing system. The example computing system includes a processor core 10 for executing programming instructions and for accessing a memory system 12, among other things. The example computing system further includes a cache system comprising multiple levels of cache memory. In the example computing system, the cache system includes an L1 cache 14 that is close to the core 10 and an L2 cache 16 intermediate between the memory system 12 and the L1 cache 14.

Figure 2:
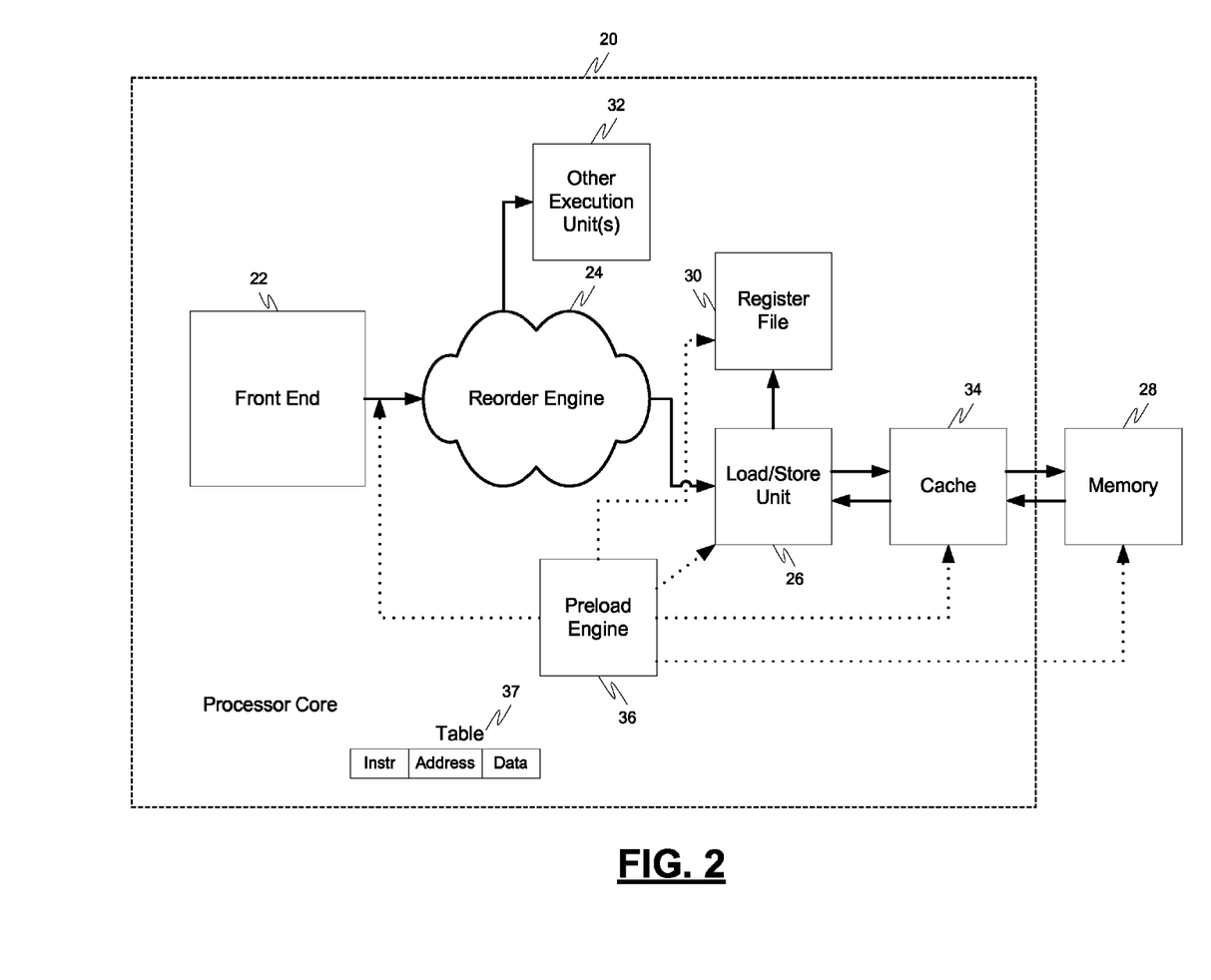
FIG. 2 is a block diagram depicting example components of a processor core.

FIG. 2 illustrates example components of a processor core 20 that has been enhanced to execute programming instructions out-of-order. The example processor core 20 includes a front end section 22 comprising various units such as an instruction fetch and instruction decode section (not shown) for fetching and decoding program instructions. The example processor core 20 further includes a reorder engine 24 for dispatching programming instructions to various execution units within the processor core for execution. The reorder engine 24 may dispatch certain instructions to execution units out of program order, which may enhance the performance of the processor core 20. As an example, there may be an instruction that is subsequent in program order to a given instruction but does not depend on the given instruction. If execution of the given instruction is delayed for some reason, the later instruction may execute before the given instruction completes, which may improve overall performance.

One illustrated execution unit in FIG. 2 is the load/store unit 26. The load/store unit 26 is provided, among other things, to load data from the memory 28 to a register file 30, and to store data from the register file 30 to the memory 28. Other execution unit(s) 32 may perform operations on data in the register file 30 based on instructions dispatched from the reorder engine 24 after loading or before storing operations.

A cache system 34 is positioned intermediate between the memory 28 and the processor core 20. The cache system 34 includes one or more levels of cache memory for providing the processor core 20 with quicker access to data than can be provided by the memory 28. As an example, the access time for providing data from the memory 28 may be around 300 ns compared to around 5 ns for data stored in an L1 cache. Consequently, it is desirable for memory accesses to be satisfied from the cache 34 as much as possible instead of from the memory 28.

To ensure that the cache 34 contains data that may be requested by a memory operation instruction (such as a load instruction), a preload engine 36 is employed. The preload engine 36 predicts the memory location of data in main memory 28 that may be requested by memory operation instructions and issues instructions for that data to be loaded into the cache 34 prior to data being needed. In one implementation, the preload engine 36 collects a history of memory accesses and based on the historical pattern of memory accesses predicts which memory locations will be useful in the future. In one implementation, the preload engine 36 also tracks a program counter, which allows the preload engine 36 to also predict the instructions that will use the data at the predicted memory locations. The preload engine 36 may employ a stride detection algorithm or some other algorithm to predict memory locations for data that may accessed. An example of a system and method for implementing a preload engine that employs a stride detection algorithm is described in co-pending U.S. application Ser. No. 13/847,156, which is incorporated herein by reference.

The example preload engine 36 can also improve processor performance by causing the data that may be requested by memory operation instructions to not only be moved into cache memory (e.g., cache 34) but to also be moved into a register file (e.g., register file 30). The preload engine 36 predicts the memory operation instruction that may request the data and stores information regarding the predicted memory operation instruction and the address for the data in a table 37 associated with the preload engine.

Figure 3:
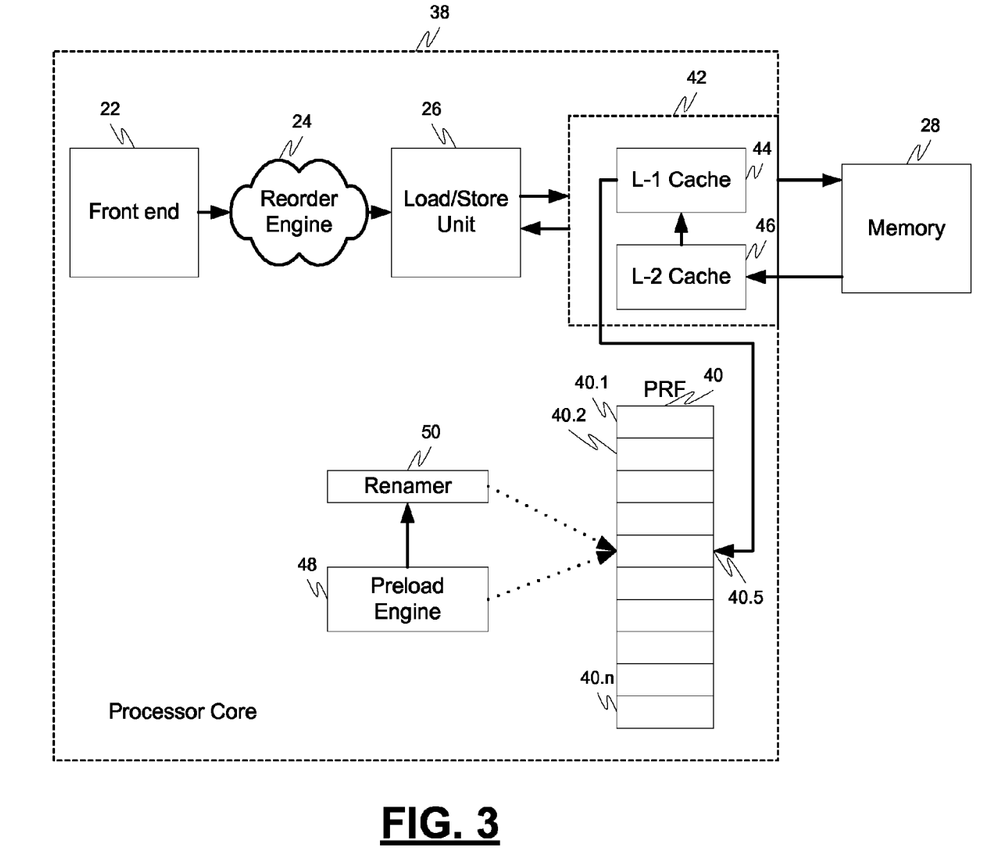
FIG. 3 is a block diagram depicting an example processor core that includes a preload engine and a physical register file.

FIG. 3 is a block diagram of an example processor core 38 wherein an example physical register file ("PRF") 40 containing a plurality of PRF elements 40.1 to 40.n is depicted. Similar to the example system of FIG. 2, the processor core 38 of FIG. 3 includes a front end section 22 comprising various units such as an instruction fetch and instruction decode section (not shown) for fetching and decoding program instructions. The processor core 38 further includes a reorder engine 24 for dispatching programming instructions to various execution units within the processor core for execution. The reorder engine 24 may dispatch certain instructions to execution units out of program order, which may enhance the performance of the processor core 38. The processor core 38 further includes a load store unit 26. The load store unit 26 is provided, among other things, to load data from the memory 28 to the physical register file 40, and to store data from the register file 40 to the memory 28. Other execution unit(s) 32 may perform operations on data in the register file 40 based on instructions dispatched from the reorder engine 24 after loading or before storing operations. A cache system 42 is positioned intermediate between the memory 28 and the processor core 38. The cache system 34 includes at least an L-1 cache 44 and an L-2 cache 46 for providing the processor core 38 with quicker access to data than can be provided by the memory 28.

To ensure that the cache 44 contains data that may be requested by memory operation instructions, a preload engine 48 is employed. The preload engine 48 predicts the memory location of data in main memory 28 that may be requested by memory operation instructions and issues instructions for that data to be loaded into the cache 44 prior to data being needed.

The processor core 38 makes use of register-renaming. In this design a register is not accessed directly. Instead, each register that is architecturally specified is actually a pointer into a much larger array of registers 40, which allows speculative execution of instructions without excessive amounts of data movement.

The preload engine 48 causes the data that may be requested by memory operation instructions to not only be moved into cache memory, but to also be moved into an entry in the PRF 40. In the illustrated example, data in the L-1 cache is moved to entry 40.5 in the PRF 40. The preload engine 48 also causes the renamer 50 to associate a logical register with the entry 40.5. This allows an instruction that is dependent on a memory operation instruction to fetch data from memory to use the data before the memory operation instruction executes. The preload engine 48 exploits the properties of register renaming to allow predictive execution loads, thereby reducing the load use penalty.

Figure 4:
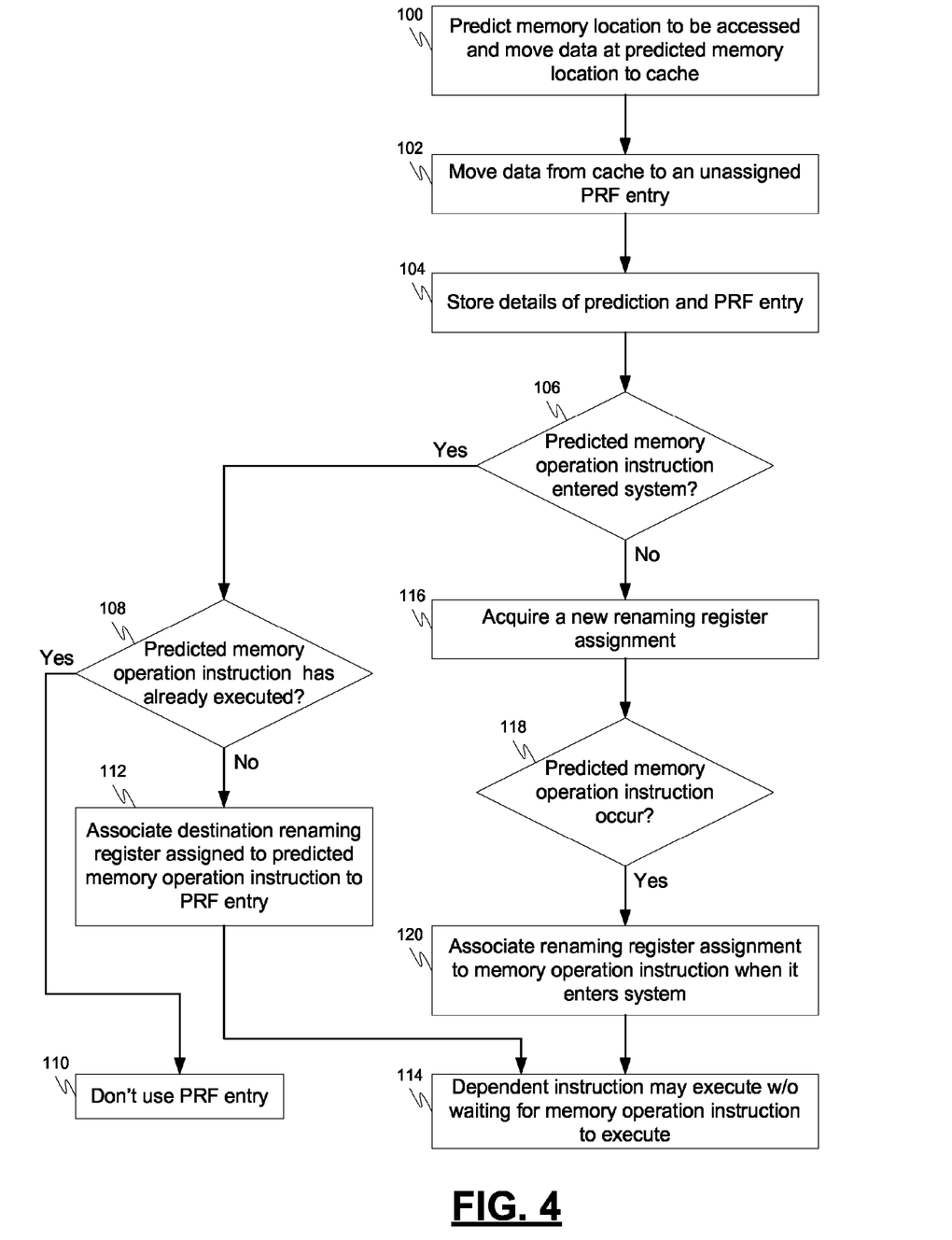
FIG. 4 is a process flow chart depicting an example method for expanding preload capabilities to encompass a register file.

FIG. 4 is a process flow chart depicting an example process performed by a prefetch engine, in a processor core, for expanding memory preload capabilities to a register file. A memory location likely to contain data to be requested by a memory operation instruction such as a load instruction is predicted and the data at that predicted memory location is moved into cache prior to the data being needed (operation 100). The data from the predicted memory location that had been moved to cache is moved from the cache to an unassigned PRF entry (operation 102). Details of the prediction and the PRF entry are stored in a table (operation 104). A check is then made to determine if the predicted memory operation instruction has entered the system, i.e., has been fetched and decoded (operation 106).

If the predicted memory operation instruction has entered the system, a check is made to determine if the predicted memory operation instruction has already executed (operation 108). If the predicted memory operation instruction has already executed, then the PRF entry is not used (operation 110). If the predicted memory operation instruction has not already executed, then the destination renaming register assigned to the predicted memory operation instruction is associated with the PRF entry (operation 112). A dependent instruction, i.e., an instruction following a memory operation instruction that performs an operation on the data retrieved from the memory operation instruction, may execute without waiting for the memory operation instruction to execute (operation 114) because the data the dependent instruction needs is available in a register file.

If the predicted memory operation instruction has not entered the system, a new renaming register assignment is acquired (operation 116). The system waits for the predicted memory operation to enter the system. When it is determined that the predicted memory operation has entered the system (operation 118), the renaming register assignment is associated with the memory operation instruction (operation 120). A dependent instruction, i.e., an instruction following a memory operation instruction that performs an operation on the data retrieved from the memory operation instruction, may execute without waiting for the memory operation instruction to execute (operation 114) because the data the dependent instruction needs is available in a register file.

Figure 5:
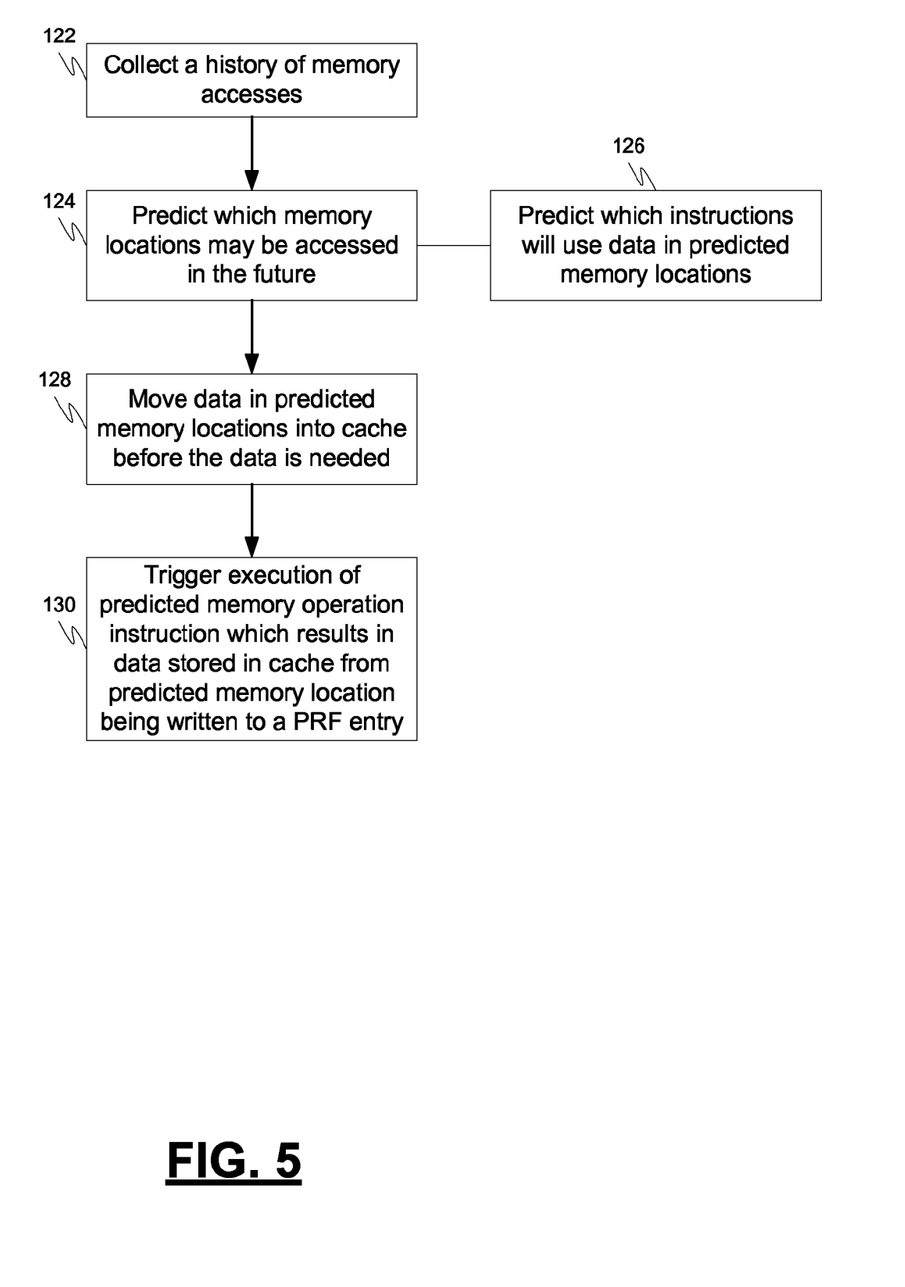
FIG. 5 is a process flow chart depicting an example method for moving data predicted to be used by a memory operation instruction into a register file.

FIG. 5 is a process flow chart depicting an example process performed in a processor core for predicting future memory accesses and moving data to a PRF entry. A historical collection of memory accesses is evaluated (operation 122). Using the collection, a prediction is made regarding a memory location that may be accessed in the future (operation 124). The prediction also involves predicting an instruction that will use the predicted data (operation 126). Data at the predicted memory location are caused to be moved into cache memory before the data are needed by a memory operation instruction (operation 128). Execution of the predicted memory operation is triggered, which results in the data stored in cache corresponding to the predicted address being written to a PRF entry (operation 130).

Figure 6:
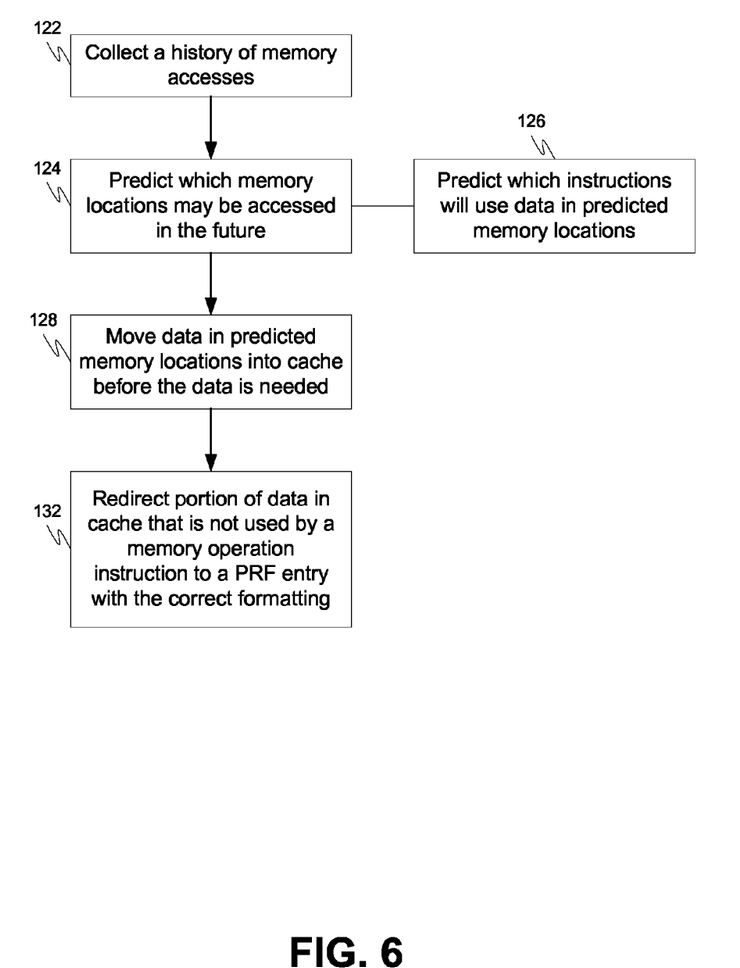
FIG. 6 is a process flow chart depicting another example method for moving data predicted to be used by a memory operation instruction into a register file.

FIG. 6 is a process flow chart depicting another example process performed in a processor core for predicting future memory accesses and moving data to a PRF entry. Similar to the process of FIG. 5, a historical collection of memory accesses is evaluated (operation 122). Using the collection, a prediction is made regarding a memory location that may be accessed in the future (operation 124). The prediction also involves predicting an instruction that will use the predicted data (operation 126). Data at the predicted memory location are caused to be moved into cache memory before the data are needed by a memory operation instruction (operation 128). A portion of data in cache that is not used by a memory operation instruction is redirected to a PRF entry with correct formatting (operation 132).

Figure 7:
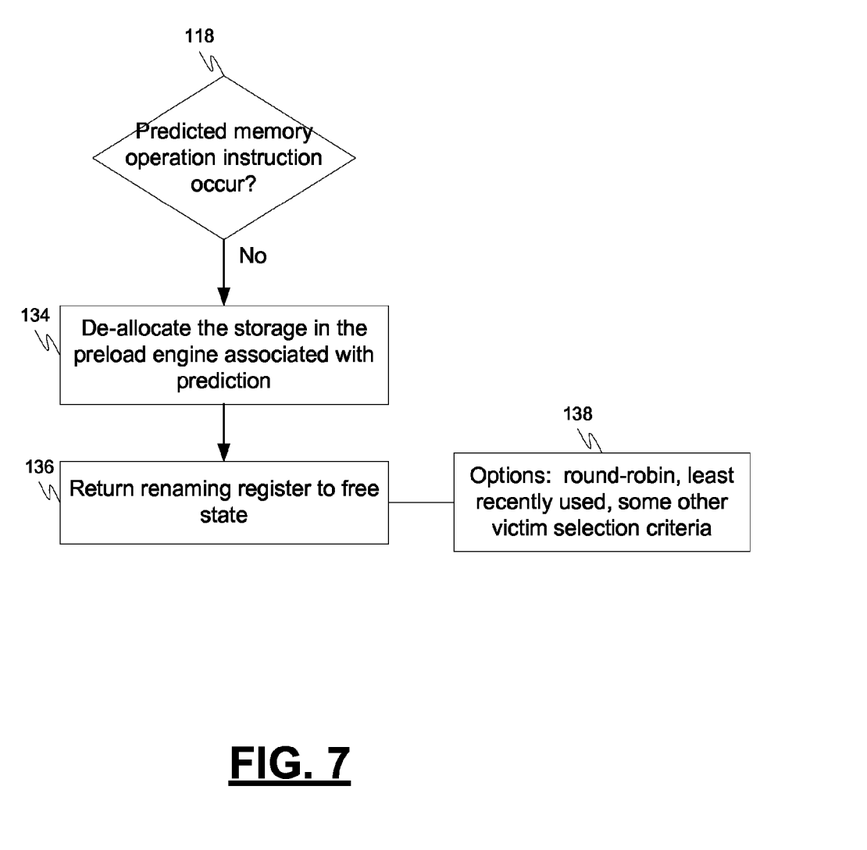
FIG. 7 is a process flow chart depicting an example method for handling a scenario in which a predicted memory operation instruction does not occur.

FIG. 7 is a process flow chart depicting an example process performed in a processor core in cases where a predicted memory operation instruction does not occur. This process may be used in connection with the example process depicted in FIG. 4. After a new renaming register assignment is acquired (FIG. 4, operation 116), if it is determined the predicted memory operation will not occur (operation 118), the table containing details of the prediction and the PRF entry is de-allocated (operation 134). Also, the renaming register assignment is returned to a free state (operation 136). Returning the renaming register assignment to a free state may involve making the renaming register available for use for another selection or returning the renaming register to the pool of available renaming registers where the next register used may be selected using round-robin, least recently used, or some other victim selection criteria (operation 138).

Figure 8:
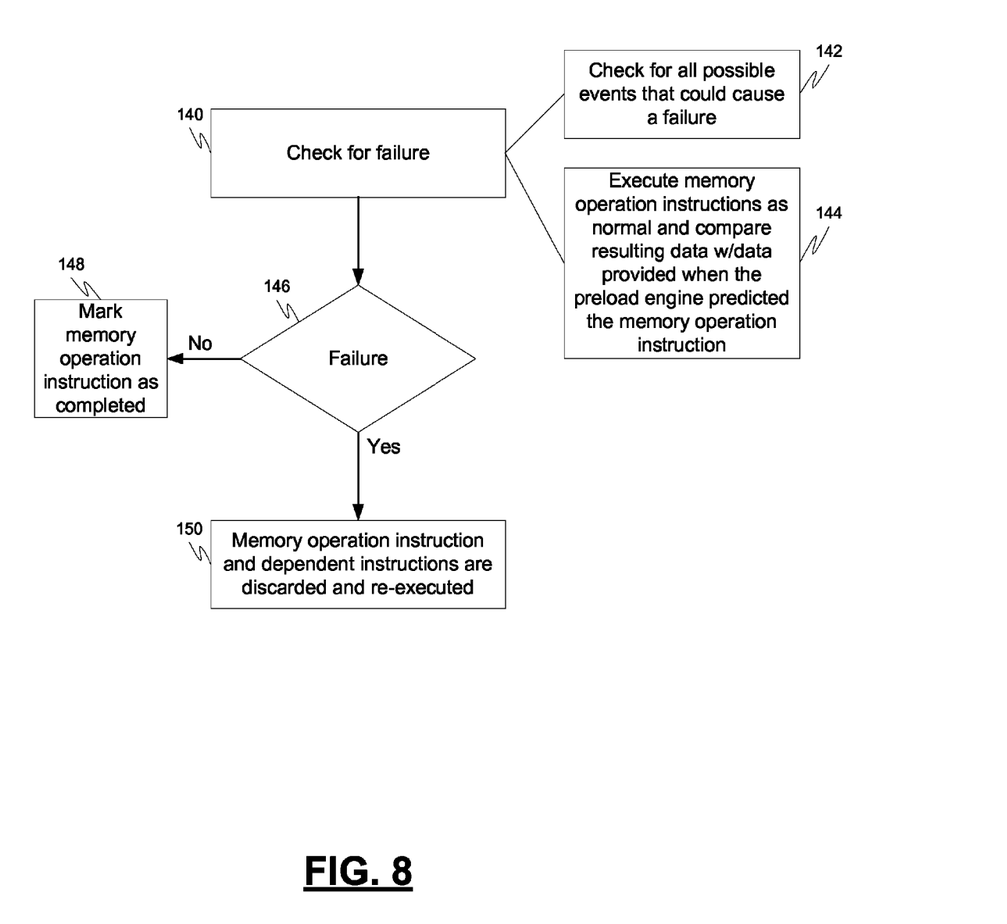
FIG. 8 is a process flow chart depicting an example method for checking for and handling prediction errors.

FIG. 8 is a process flow chart depicting an example process for recovering from prediction failures. After a memory operation instruction is predicted, the data predicted to be acquired by the predicted memory operation may change. This can occur due to a change in instruction flow, an unexpected intervening store between the pre-load and the actual load, because the instructions have been altered, because the translation table has changed, or because the code is too complicated to predict correctly, among other things. If the format of the memory operation instruction does not match that of the predicted memory operation instruction, it is possible to detect this and discard the entry instead of matching the entry to the instruction. If there is an intervening store or change in prediction table and the memory operation instruction has not yet been matched to the prediction, the prediction can simply be discarded. If the memory operation instruction has been matched to the predictor, any of these cases will need to cause the memory operation instruction and instructions dependent on the memory operation instruction to be discarded and re-executed (usually by a flush and front-end resteer).

A failure check is conducted (operation 140). The check may involve checking for all possible events that could cause a failure (operation 142). The failure check may also involve executing memory operation instructions as normal and comparing resulting data with data provided when the preload engine predicted the memory operation (operation 144). A determination is made regarding whether a failure occurred (operation 146). If a failure is not detected then the memory operation can be marked as complete (operation 148). If a failure is detected, then the memory operation instruction and dependent instructions are discarded and re-executed (operation 150).

Figure 9:
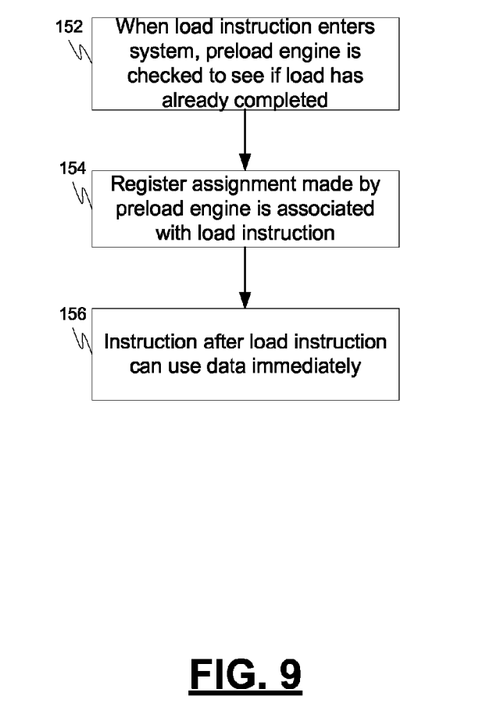
FIG. 9 is a process flow chart that depicts an example process for use when an instruction that might have been predicted enters the system.

FIG. 9 is a process flow chart depicting an example process for processing instructions that may have been predicted by a preload engine. When a memory operation instruction (such as a load instruction) enters the system, the preload engine is checked to determine if the predicted memory operation instruction has already completed (operation 152). Any register assignment made by the preload engine is associated with the memory operation instruction (operation 154). Any dependent instruction (i.e., instruction following the memory operation instruction that uses the data fetched by the memory operation instruction) can use the data once the renaming register assignment is associated with the memory operation instruction (operation 156).

Because the cost of a mispredicted load can be high (a potential pipe-flush), it may be beneficial to only use predictions that have a high chance of being correct. There are several heuristics that could aid in this. One option is to perform trial predictions on a memory operation instruction, and only start making real predictions if the trial predictions are correct. Another option is to use static code analysis to identify likely memory operation instructions, e.g. loads in a loop are much easier to predict. An additional option is to track instructions which update the address register used by the memory operation instruction, and stop making predictions if the update pattern changes. Yet another option is to reset the prediction structure and discard unused predictions on events that indicate a change of context or code direction. Some possible indicators include branch mispredictions, function returns, Icache/tlb maintenance, loop termination, etc.

Figure 10:
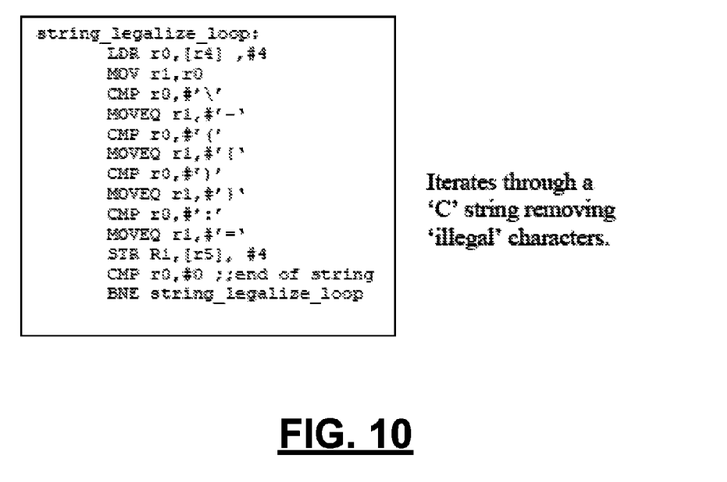
FIG. 10 is a diagram that depicts example program code containing memory operation instructions that might be predicted.
Figure 11A:
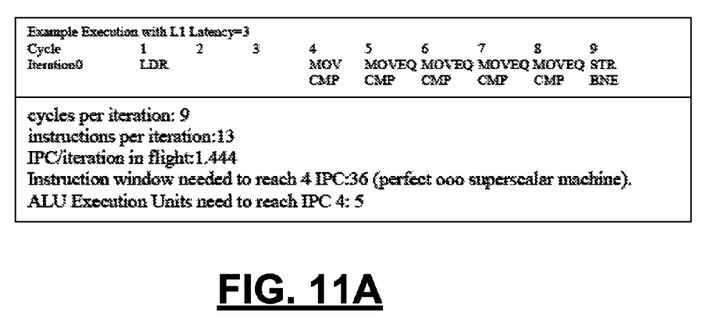
FIGS. 11A and 11B are diagrams illustrating how the load use cost of example program code of FIG. 10 can be reduced.
Figure 11B:
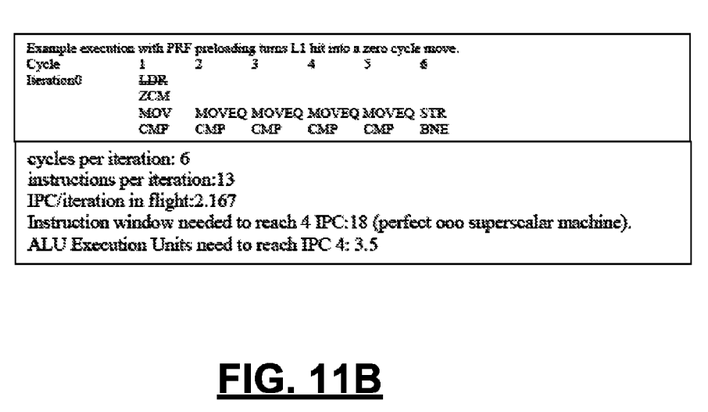

Depicted in FIG. 10 is example program code that might benefit from methods and systems described herein. FIGS. 11A and 11B illustrate how the example code depicted in FIG. 10 might benefit from the methods and systems described herein. In particular, FIG. 11A illustrates the number of cycles that it may take a processor to execute the code depicted in FIG. 10. FIG. 11A illustrates that it might take 9 cycles per iteration of the string legalize loop, among other things, because of the 3 cycle latency with the LDR instruction. FIG. 11B illustrates that using methods described herein, the LDR could be predicted and effectively replaced by a zero cycle move (ZCM) therefore allowing the sample code to execute in 6 cycles per iteration and boosting performance.

The methods and systems described herein may exploit the properties of register renaming to allow predictive execution loads and potential eliminate some of the load use penalty. The examples provided herein illustrated use with "physical register file" style renaming. Other examples may include use with other renaming styles such as "renaming with writeback" style renaming.

The patentable scope of the described subject matter may include other examples. Additionally, the methods and systems described herein may be implemented with many different types of processing devices.

It should be understood that the meaning of "in" includes "in" and "on" unless the context clearly dictates otherwise.

Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method comprising:
   predicting an address of a memory location containing data to be accessed by a first memory operation instruction that has not yet executed; and
   prior to the first memory operation instruction executing,
       moving the data in the memory location to an unassigned register file entry,
       causing a renaming register to assign the register file entry to an architectural register,
       responsive to the renaming register assigning the register file entry to the architectural register, permitting a second instruction to execute using the data moved to the register file, wherein the second instruction is dependent on the first memory operation instruction, and
       determining whether correct data was moved to the register file entry for the first memory operation instruction.

2. The method of claim 1, wherein moving the data comprises:
   causing the data to be stored in cache memory; and
   moving the data from the cache memory to the register file entry.

3. The method of claim 1, further comprising:
   storing details of the first memory operation instruction and the register file entry in a table.

4. The method of claim 1, wherein the register file entry is an entry in a physical register file.

5. The method of claim 1, wherein moving the data in the memory location to an unassigned register file entry prior to the first memory operation instruction executing comprises moving the data in the memory location to an unassigned register file entry prior to the first memory operation instruction being decoded.

6. The method of claim 5, further comprising:
   subsequent to the first memory operation instruction being decoded, associating the assignment of the register file entry to the first memory operation instruction.

7. The method of claim 6, wherein the second instruction that is dependent on the first memory operating instruction executes prior to the first memory operating instruction executing.

8. The method of claim 1, further comprising:
   associating the assignment of the register file entry to the first memory operation instruction.

9. The method of claim 8, wherein the second instruction that is dependent on the first memory operating instruction executes prior to the first memory operating instruction executing.

10. The method of claim 1, wherein moving the data in the memory location to an unassigned register file entry comprises:
    generating and triggering execution of a third memory operation instruction before the first memory operation instruction executes, wherein execution of the third memory operation instruction causes the data to be stored in cache memory.

11. The method of claim 1, wherein determining whether the correct data was moved to the register file entry for the first memory operation instruction comprises:

checking for possible events that could cause incorrect data to be moved to the register file entry for the first memory operation instruction.

12. The method of claim 1, wherein determining whether the correct data was moved to the register file entry for the first memory operation instruction comprises:
  executing a fourth memory operation instruction that retrieves data; and
  comparing the data retrieved by the fourth memory operation instruction to the data moved for the first memory operation instruction.

13. The method of claim 1, further comprising:
  responsive to a determination that incorrect data was moved to the register file entry for the first memory operation instruction,
    discarding the second instruction, and
    re-executing the second instruction using the correct data.

14. A method comprising:
  predicting an address of a memory location containing data to be accessed by a first memory operation instruction that has not yet executed; and
  prior to the first memory operation instruction executing,
    moving the data in the memory location to an unassigned register file entry, wherein moving the data in the memory location to an unassigned register file entry comprises moving data in cache memory that was fetched but not used by an executed memory operation instruction to the unassigned register file entry,
    causing a renaming register to assign the register file entry to an architectural register, and
    responsive to the renaming register assigning the register file entry to the architectural register, permitting a second instruction to execute using the data moved to the register file, wherein the second instruction is dependent on the first memory operation instruction.

15. A method comprising:
  predicting an address of a memory location containing data to be accessed by a first memory operation instruction that has not yet executed;
  prior to the first memory operation instruction executing,
    moving the data in the memory location to an unassigned register file entry,
    causing a renaming register to assign the register file entry to an architectural register,
    responsive to the renaming register assigning the register file entry to the architectural register, permitting a second instruction to execute using the data moved to the register file, wherein the second instruction is dependent on the first memory operation instruction,
  determining that the first memory operation instruction has not been decoded; and
  returning the register file entry to a free state.

16. A computerized system comprising:
  a register file having a plurality of entries;
  a renaming register for associating an entry in the register file with an architectural register; and
  a preload engine configured to:
    predict an address of a memory location containing data to be accessed by a first memory operation instruction that has not yet executed; and
    prior to the first memory operation instruction executing,
      move the data in the memory location to an unassigned register file entry in the register file,
      cause the renaming register to assign the register file entry to the architectural register,
      responsive to the renaming register assigning the register file entry to the architectural register, permit a second instruction to execute using the data moved to the register file, wherein the second instruction is dependent on the first memory operation instruction, and
      responsive to a determination that incorrect data was moved to the register file entry for the first memory operation instruction, (i) discard the second instruction, and on re-execute the second instruction using correct data.

17. The system of claim 16, wherein the register file is a physical register file.

18. The system of claim 16, wherein the preload engine is further configured to:
  subsequent to the first memory operation instruction being decoded, associate the assignment of the register file entry to the first memory operation instruction.

* * * * *